July 5, 1932.　　　　E. ANDERSON　　　　1,866,002
TRANSMISSION
Filed Sept. 8, 1928　　　5 Sheets-Sheet 1

Fig. 1

INVENTOR
Emil Anderson
BY
Charles G. Hensley
ATTORNEY

July 5, 1932.    E. ANDERSON    1,866,002
TRANSMISSION
Filed Sept. 8, 1928    5 Sheets-Sheet 2

INVENTOR
Emil Anderson
BY Charles G. Hensley
ATTORNEY

July 5, 1932.  E. ANDERSON  1,866,002
TRANSMISSION
Filed Sept. 8, 1928   5 Sheets-Sheet 3

INVENTOR
Emil Anderson
BY
Charles G. Hensley
ATTORNEY

July 5, 1932. E. ANDERSON 1,866,002
TRANSMISSION
Filed Sept. 8, 1928  5 Sheets-Sheet 5

INVENTOR
Emil Anderson
BY Charles G. Kendley
ATTORNEY

Patented July 5, 1932

1,866,002

UNITED STATES PATENT OFFICE

EMIL ANDERSON, OF BRIARCLIFF MANOR, NEW YORK

TRANSMISSION

Application filed September 8, 1928. Serial No. 304,793.

My invention relates to transmissions, and while not limited to any particular use, it is especially adapted for, and I have so illustrated it, as applied to automobiles. One object of the present invention is to provide a transmission mechanism that will automatically adjust the speed of a driven shaft according to its load when the load becomes greater than the driving or engine torque. It is well known that in hydrocarbon engines, such as are used for driving automobiles, that the engine is most efficient at high speeds, and it is also known that when the load becomes too great for the torque that the engine is slowed down in its operation and that this slowing down causes a reduction in the power delivered by it. When going up a hill the load, near the beginning, may be such as will permit the engine to run at high speed and to deliver its maximum power represented by a maximum torque in the driving shaft. However, as the automobile proceeds to climb the hill the load becomes greater, until it partially or wholly overcomes the torque of the engine, whereupon the engine speed reduces and the engine delivers less than its maximum power and readjustment is necessary to prevent stalling of the engine. This is usually done by manually shifting the gears in the transmission mechanism to a lower ratio.

The shifting of the gears while the vehicle is climbing a hill, is not only an annoyance but there are elements of danger in the operation. With the present mechanism the manual shifting of gears as the load increases or decreases is avoided and instead, the same result is accomplished, and more effectively, by automatic means.

With the present mechanism it is possible to set the mechanism into operation for either forward or reverse movement and without manual change of gears it is possible to operate the vehicle at any speed up to the maximum, entirely through the control of the throttle. During the various changes of speed the engine is operated more efficiently notwithstanding variations in the load. It will be apparent that the driver may accelerate or retard the speed of the vehicle by simply manipulating the throttle and he need give no attention to the shifting of gears except when the vehicle is to be entirely stopped, started, or its direction reversed. Infinitesimal variations in the speed of the vehicle may be obtained solely through the regulation of the throttle. Furthermore, these variations in speed may be accomplished smoothly, thereby avoiding undue strain on the parts of the mechanism and of the vehicle.

Another object of the invention is to provide a centrifugally acting governor clutch that will hold the device in direct driving relation at a predetermined engine speed and which will release the direct drive when the load on the driven shaft is approximately up to or greater than the engine torque. This governor clutch also carries part of the load after it is released.

Another object of the invention is to provide a variable intermediate speed in the transmission mechanism which acts through the medium of a liquid, such as lubricating oil or mercury, between the points at which the direct or positive speed becomes operative and the point at which the positive low reduction gear becomes operative.

The present invention, therefore, contemplates the use of a centrifugal governor clutch and a positive gear reduction, interposed between this; flexible resistance elements, consisting of the centrifugal governor and the auxiliary work done by the fluid on the turbine unit to automatically become effective at an intermediate speed when the load on the driven shaft is greater than the engine torque. The resistance elements differentiate so that as the speed ratio goes down to a point where the positive low gear reduction has been established by the maximum load, the centrifugal action decreases and the liquid action increases. The two act on one another, the first or centrifugal to allow the liquid to act, and thereafter the liquid acts on the centrifugal device, the two together having a natural tendency to connect direct drive.

In the present case the force taken from the fly wheel to operate the flexible transmission is returned to avoid the loss of this force.

Another object of the invention is to provide a construction having the features above outlined and at the same time having a minimum number of parts; having the parts of the mechanism self-contained and self-lubricating; and one in which the lubricant may serve as a part of the automatic mechanism. These and other objects and advantages to be hereinafter set forth are accomplished with the present invention and in the drawings I have shown the same in two variations or embodiments.

In the drawings forming part of this application.

I will first describe the invention as embodied in the construction shown in Figures 1 to 11 inclusive. In the drawings I have shown the shaft 1 which is the crank shaft of the engine which may be an automobile engine. This crank shaft has attached to it the fly wheel 2 which may be of ordinary construction; that is, it consists of a disc portion 2a having a lateral flange 2c to provide a cup shaped wheel which revolves with the crank shaft 1 and which is provided with a cover 4 to form a housing or chamber 8 within which parts of the present mechanism may be mounted. The center pinion 6 is bolted or otherwise secured to the crank shaft 1, so that it revolves at all times with it. There is a housing 3 which encloses the fly wheel and various gears as will be pointed out hereinafter and the housing is provided with a cap 7 through which oil may be introduced. There is a metallic packing ring 5 surrounding a revolvable sleeve 9 and forming a packing for the removable cover 4, the latter being bolted by means of the bolts 10 to the flange of the fly wheel. Oil may be introduced into the chamber 11 in the fly wheel by removing the plug 12 as well as the plug 7 of the housing 3.

The shaft 14 is the driven shaft and it is operated from the crank shaft 1 either through the direct or flexible driving means hereinafter described at different speed ratios, and this shaft has on one end near the gear 6 the flange or disc 15 which is provided with different studs 16 and 17, preferably riveted thereto. The flange or disc 15 is either formed integral with the shaft 14 or is fixed thereto to move in unison with it.

Figures 6, 7, 8, 9:
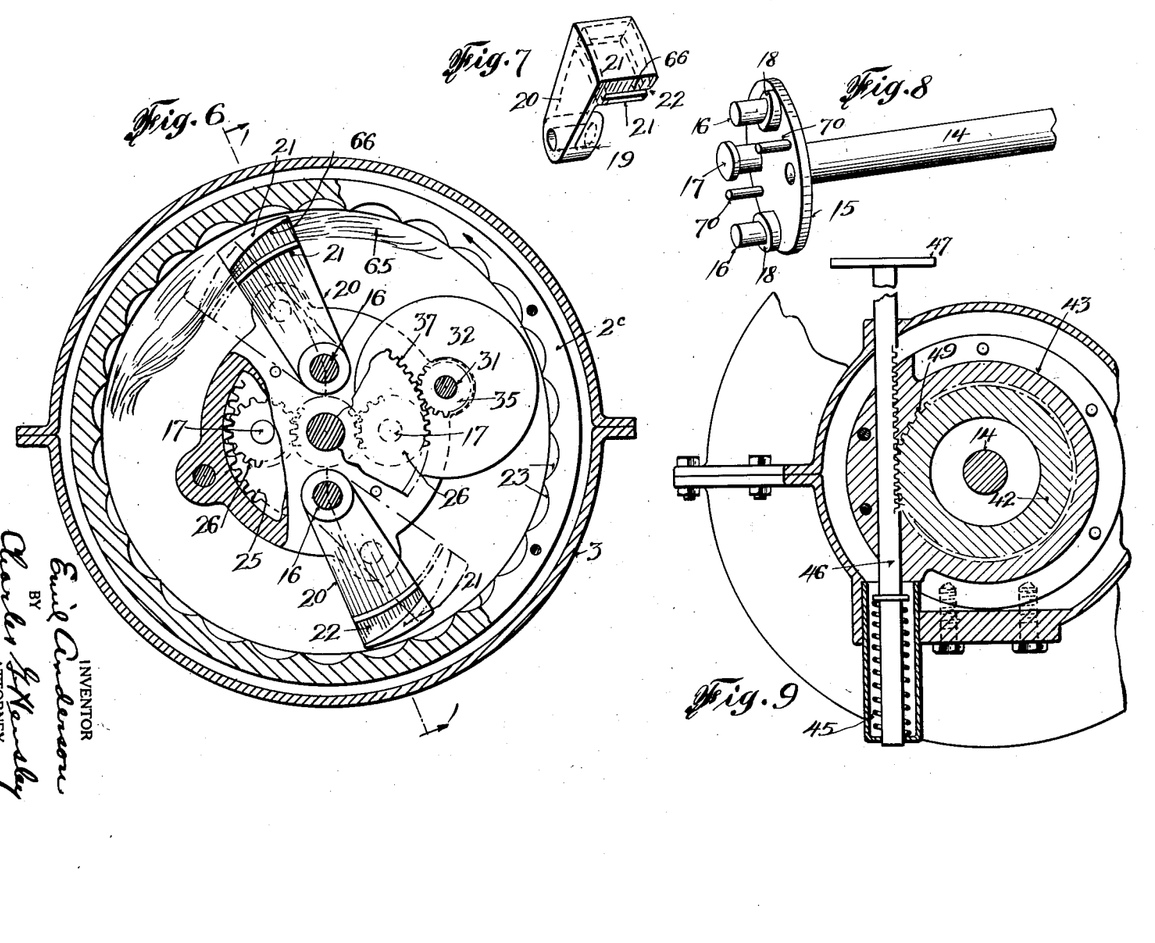
Figure 6 is a sectional view taken on the line 6—6 of Figure 1.
Figure 7 is a perspective view of one of the centrifugal members.
Figure 8 is a perspective view of a disc and a part of the shaft to which it is attached.
Figure 9 is a sectional view taken on the line 9—9 of Figure 1.
Figure 12:
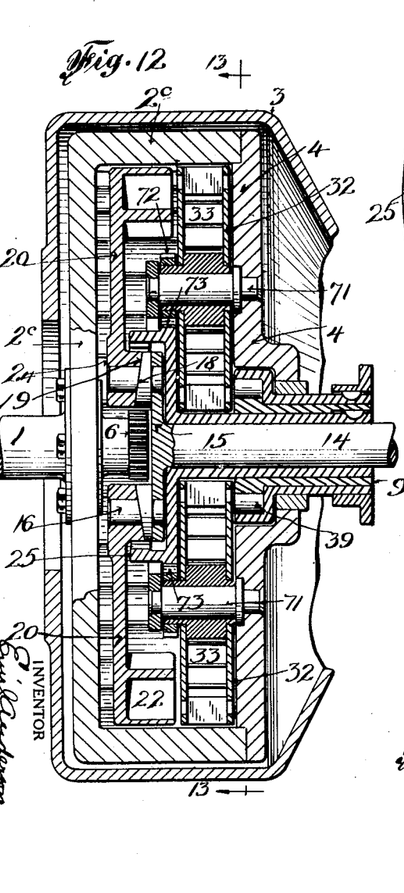
Figure 12 is a view similar to Figure 3, but showing a modified form of construction.
Figures 13, 14, 15:
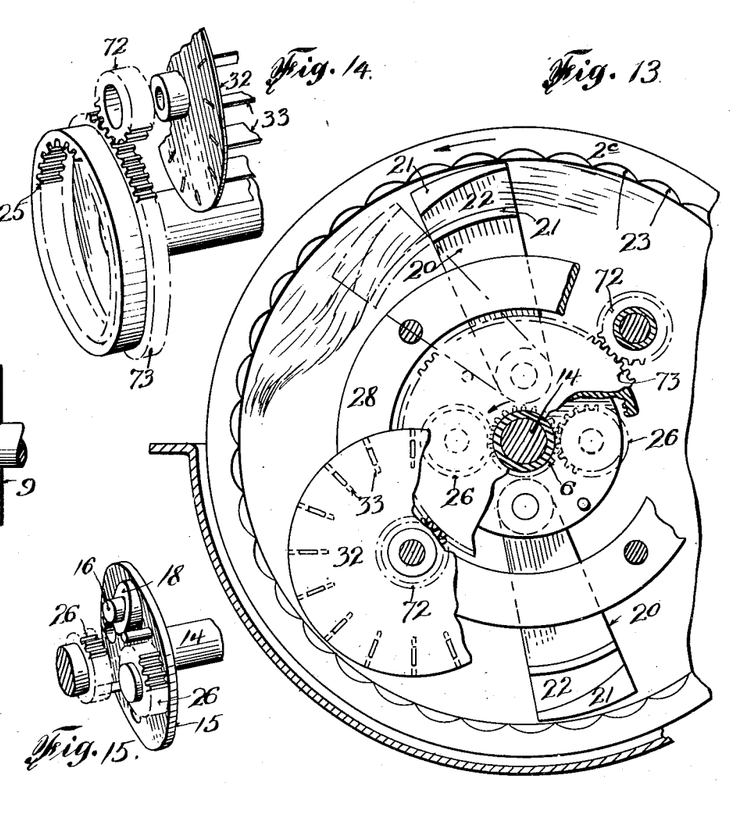
Figure 13 is a sectional view taken on the line 13—13 of Figure 12.
Figure 14 is a perspective view of one of the turbine wheels and the internal and external gears of this construction.
Figure 15 is a perspective view of the disc and planetary gears of the modified construction.

The studs 16 have spiral shoulders 18 which co-operate with and match similar spiral shoulders 19 on the weights 20 which are pivoted on these studs. These weights project outwardly from the studs 16 on which they are adapted to swing and they are provided with laterally extending flanges 21 between which there is a fluid passage 22 the upper surface of which is deflected, as shown in Figure 6, so that the oil or other fluid may act on the weight in the manner to be hereinafter described. The flange 2c of the fly wheel is provided with a number of grooves or scallops 23 in order to pocket part of the oil or other fluid and to forcibly carry it around in the form of a stream with the fly wheel.

The spiral shoulders 18, 19 co-operate so that when the weights, there being two illustrated in the drawings, stand out radially in relation to the shaft 14, they are forced laterally on the lugs 16 so that the projecting shoulder 24 of each weight presses against the disc portion 2a of the fly wheel 2 to connect these or cause them to clutch and to revolve together when in clutching engagement.

There is an internal or annular gear 25 which runs freely on the shaft 14 and the intermediate gears 26, there being two shown in the drawings, mounted on the studs 17, mesh with the internal gear 25 at opposite sides and form a planetary gear having a reduction ratio of four to one in the embodiment illustrated, although the device is not limited to any particular gear ratio. The internal gear shell 30 has studs 27 riveted to it and these studs have mounted thereon a ring 28 which serves to maintain the free ends of the studs 27 in proper spaced relation.

There are mounted to rotate freely in one direction on the studs 27 the turbine wheels 32 which are shown as consisting of parallel discs connected by the blades 33 together with the central hub portion 34. There is also arranged on each stud 27 a gear 35 which is keyed on the hub 34 of the respective turbine wheels 32. The studs 27 have curved recesses in which project rollers 36 which act as a back stop for the turbine wheels and the gears 35 in one direction. The gears 35 mesh with an external gear 37 which is mounted upon and rotates freely on the shaft 14. The hub 38 of this gear is provided with curved recesses 39 (see Fig. 5) in which are mounted rollers 39a. The sleeve 40 surrounds the hub of the gear 37 and the rollers 39a engage this sleeve in such manner that the sleeve and the gear may revolve freely in one direction, but are gripped or clutched in the opposite direction. This is a well known type of roller clutch and its operation is well known in the art.

The sleeve 40 is keyed to a flange 41 surrounding it and the latter is held stationary at certain times by the nut 42 which presses the flange against the stationary member 43. This nut 42 has a threaded engagement with a stationary housing 44 which is bolted to the exterior housing 3. When the device is in operation, the threaded nut 42 holds the flange 41 tight against the member 43 under the action of the spring 45 which operates on the rack 46 shown in Figure 9. The rack projects upwardly through the housing 3 and its upper end forms a foot treadle 47 extending above the floor 48 of the automobile, where it is adapted to be depressed and released by foot action.

The teeth of the rack 46 mesh with the teeth of the gear pinion 49 which is formed on the nut 42. There is a gear 50 keyed to the shaft 14, as shown at 51. The flange 52 on this gear is adapted to be held by the nut 42 pressed against the stationary housing 44 with more or less pressure for the purpose of resisting the rotation of the shaft 14 to slow down or stop the latter during the selection for forward or reverse drive, as will be hereinafter explained.

Figure 1:
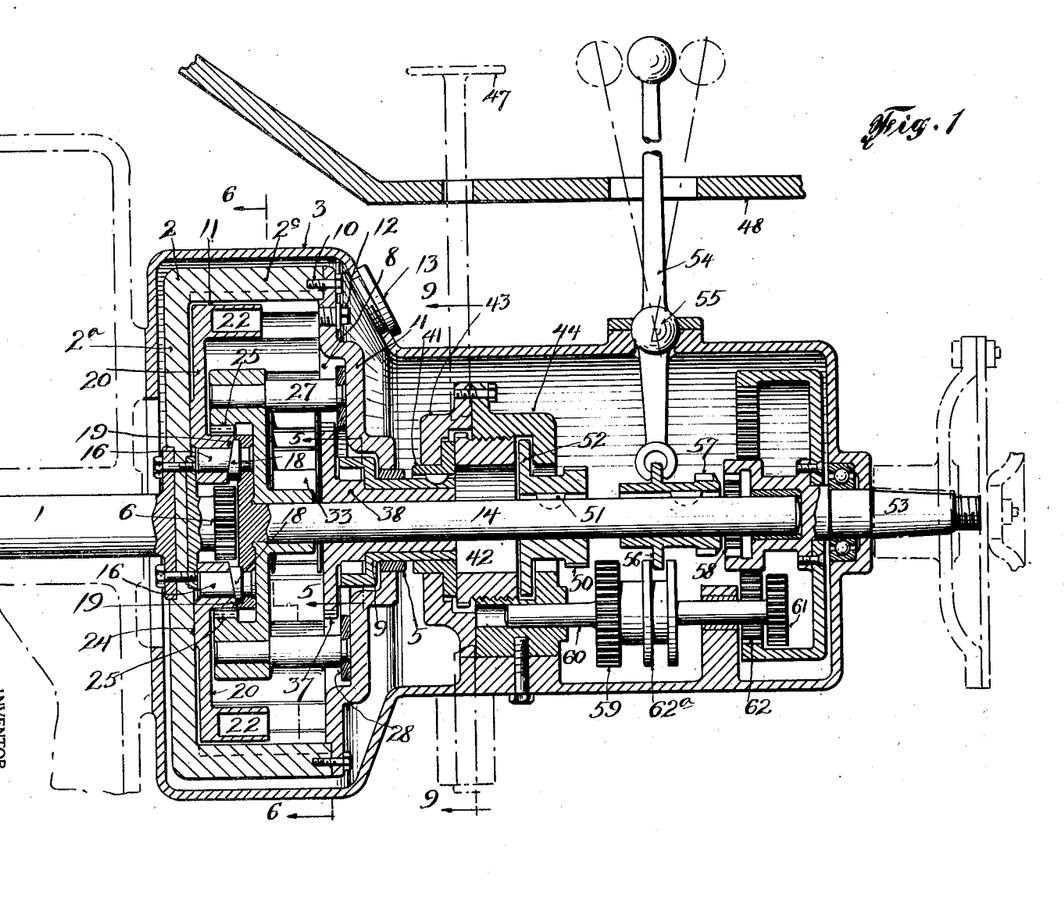
Figure 1 is a longitudinal, sectional view through the improved transmission forming the subject of my invention, showing the same applied to an automobile.
Figures 2, 10, 11:
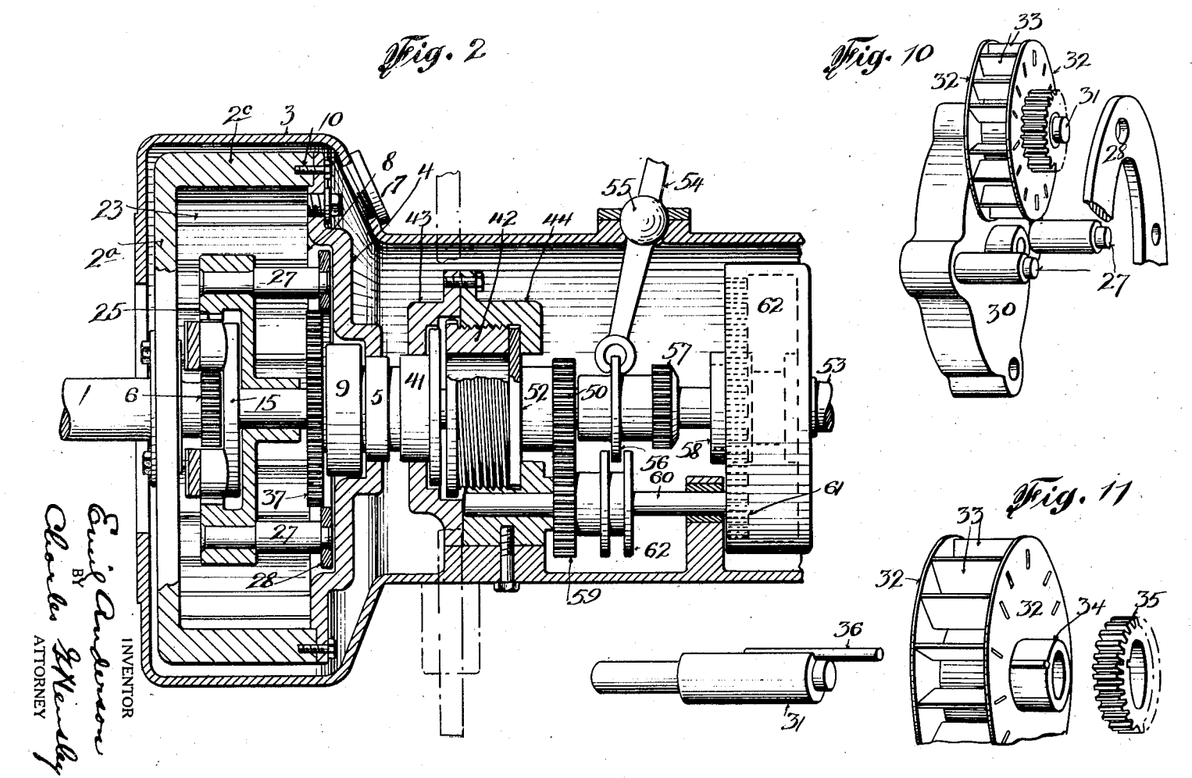
Figure 2 is a sectional view showing the parts in a different position to that shown in Figure 1.
Figure 10 is a perspective view of the internal gear casing and one of the turbine wheels.
Figure 11 is a perspective view of a portion of one of the turbine wheels and parts associated with it.
Figures 3, 4, 5:
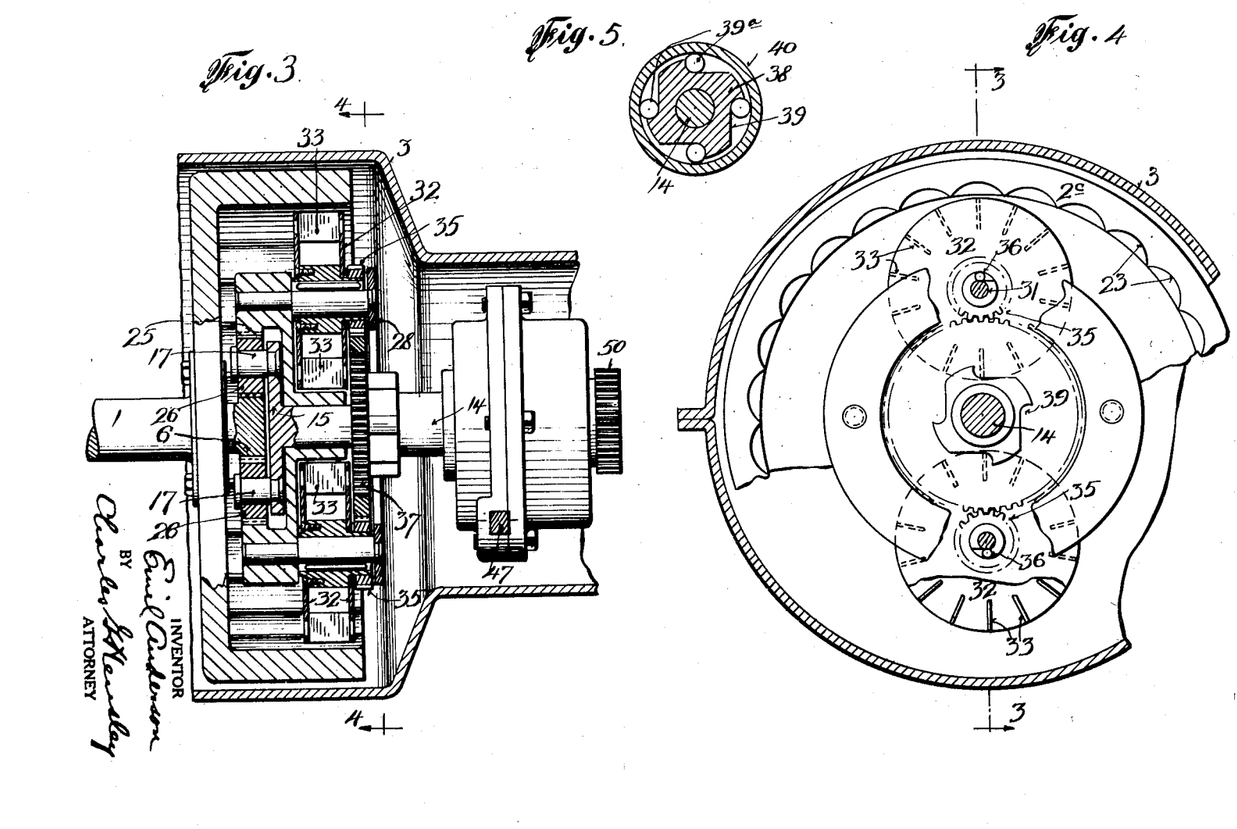
Figure 3 is a sectional view taken on the line 3—3 of Figure 4.
Figure 4 is a sectional view taken on the line 4—4 of Figure 3.
Figure 5 is a sectional view taken on the line 5—5 of Figure 1.

Any type of reduction gear may be interposed between the intermediate or transmission shaft 14 and the driving shaft 53 of the automobile but the gear shift shown herein by way of example is as follows: There is a gear shifting lever 54 as shown in Figure 1, projecting through an opening in the floor of the automobile in position to be operated by the driver; and when in the intermediate or full line position shown, the shaft 14 is disconnected from the shaft 53 whereas in the forward, dotted line position the gears are set for forward driving, whereas in the rear, dotted line position the gears are set for backward driving or reverse. This lever is shown mounted by a ball and socket joint 55 in a portion of the housing 3 and its lower forked end acts upon the flange 56 of a gear 57 which is keyed to the shaft 14. The teeth of this gear 57 are adapted to be thrown into mesh with the teeth of the gear 58 which is fixed to or integral with the drive shaft 53, when the clutch lever 54 is in its forward position. During this position, the gear 59 which is arranged on the shifting shaft 60 is out of mesh with the gear 50 and the small pinion 61 on this same shaft 60 is also out of mesh with the annular gear 62 which is also connected with the driving shaft 53.

When the clutch lever 54 is in the rearmost position, the shaft 60 is shifted by the flange 56 acting on the flanges 62a so that the gear 59 is thrown into mesh with the gear 50 whereby the former is driven from the shaft 14 and the pinion 61 is likewise thrown into mesh with the annular gear 62, so that for reverse operation the driving shaft 53 is operated at a reduced gear ratio, or low speed. The lever 54 is shown in full lines, Figure 1, in intermediate or neutral position, at which time the shaft 53 is not connected with the shaft 14. As stated above, any form of gear shift other than that shown may be used for connecting the shaft 14 and the shaft 53 for forward and reverse operation, but in the present device the gear ratio is not altered by this portion of the device except to affect the lower gear ratio for backward operation of the automobile.

*Operation*

Assuming that the motor is operating and that the clutch lever 54 is in neutral position, the fly wheel 2 and all of the parts mounted on the shaft 1 revolve together. If it is desired to start the automobile for forward operation, the rack bar 46 is depressed by pressing the foot on the treadle 47 and this causes the rack bar to move downwardly within the housing 3 in opposition to the coiled spring 45. This revolves the pinion 49 which is a part of the nut 42 so that the latter is revolved in the threaded portion of the housing 44 causing the nut to move from left to right in Figure 1. As the nut commences to move, it first releases the flange 41, and then it starts to press the flange 52 against the housing 44 and thereby resist its motion to place a load on the shaft 14 because the gear 50 is keyed to this shaft.

The weights 20 are revolving when the shaft 14 is revolving and the greater the centrifugal force the more these weights tend to straighten out to a radial position. Due to the slowing down of the shaft 14 by the action of the nut 42 in the manner described, the weights, due to the lessening of the centrifugal force, move to the left as viewed in Figure 6 and by reason of the inclined surfaces 18, 19 the weights shift laterally and release their grip upon the fly wheel 2.

There is a body of oil, mercury or other liquid 65 contained in the chamber 11 within the fly wheel, which is carried around by the fly wheel, part of it being held in the grooves 23 so that there is an annular stream of oil or other liquid moving around with the fly wheel. The liquid, which is preferably oil, acts on the deflecting surface 66 of the centrifugal weights and the force of this oil tends to move the weights in the opposite direction to that caused by the centrifugal action due to their revolving with the shaft 14, so that when the latter shaft is reduced in speed or brought to a stop, the current of oil acting on the weights causes them to move to the left as viewed in Figure 6 and bring about a positive disengagement of the weights from the fly wheel 2.

The shaft 14 is now stationary or nearly so, and the studs 17 on which the planetary gears 26 are carried, are also stationary. The planetary gears at this time, therefore, rotate upon their own axes but they do not planetate. The internal gear 25 on which the turbine wheels are mounted, is caused by the planetary gears to operate or revolve in a direction which causes the portions adjacent to the fly wheel to move in the opposite direction to the fly wheel.

As the flange 41 is free, the sleeve 40 is also free and therefore forms no backstop for the gear 37 and this makes it possible for the internal gear to rotate backwardly. The body of oil referred to, which is carried around by the fly wheel, acts on the blades 33 of the turbine, but as the gear 35 meshes with the gear 37 and that is free on the shaft 14 and has no backstop against the sleeve 40, it simply rotates idly. At this time the driver may move the shifter lever forward and engage the sliding gear 57 to the internal gear 58 on the shaft 53 and release the foot treadle 47 so that the spring 45 returns the rack 46 and rotates the nut 42 in the opposite direction to that first described. Now the backstop is set and the car is moving forward. If the movement of the clutch lever had been in the reverse direction the gear 59, 50 and 61, 62 would have been thrown into mesh for reverse drive. To assume that the first operation was effected, the foot treadle 47 which was partially released before, is now entirely released, and the nut 42 by the upward motion of the rack bar 46 causes the flange 41 to be locked to the stationary member 43. When the treadle 47 is entirely released, the shaft 14 is released in so far as the member 44 is concerned, but the nut 42 has again locked the flange 41 against the stationary member 43 and this prevents the sleeve 9 from rotating so that the rollers 39 serve to prevent any backward movement of the shaft 14.

The driver will now accelerate the engine by operating the throttle. The load which must be overcome by the torque of the engine is generally greatest when the vehicle is at a standstill, due to inertia, and at the time the vehicle is first started there is no centrifugal action of the weights 20 so that these weights do not engage the fly wheel 2.

The shaft 14 is at this moment directly connected to the drive shaft 53. The planetary gears 26 are in operation and the gear 25 is subject to a backward rotation. The oil being carried around by the fly wheel exerts a pressure on the deflecting surfaces 66 to hold the weights against the fixed stops 70 and the oil velocity at this time, due to the revolutions of the fly wheel, may be as much as 5000 feet per minute, or more, depending on the speed of the engine. The body of oil being carried around by the fly wheel exerts impulses on the blades 33 of the turbine wheels, tending to rotate these turbines in the same direction as the movement of the fly wheel. This action on the turbine wheels affects also their gears 35, so that the latter exert pressure on the gear 37 against the back stop and thereby counteracts the tendency of the internal gear to revolve backwardly. The internal gear will come to rest when the tooth pressure on the planetary gear 26 against the internal gear 25 is greater than the tooth pressure of the turbine gear 35 against the gear 37. The turbine wheels would now start to revolve and to planetate in the opposite direction to that of the fly wheel if it were not for the fact that the roller 36 prevents this movement by forming a back stop to the gear 35 and preventing its planetary movement backwardly. The back stop action of the rollers 39 and of the roller 36 on the turbine wheels combine to form a stationary reaction for the maximum load and a fixed reduction when the resistance or driving torque decreases to a point where the body of revolving oil can revolve the turbine wheels. There is a follow-up reaction against the rollers 39 acting on the internal gear forwardly, so that there is an increase of the speed of the shaft 14 until the weights 20 have been forced, by centrifugal action, to straighten out and to connect directly by clutch action with the fly wheel 2.

The tooth pressure of the gear 6 and the counterbalancing action of the internal gear transfers driving power through the intermediate gears to the studs 18 which are fixed in relation to the shaft 14. If the rollers 36 or their equivalent were not used, the turbine wheels would planetate backwardly until the shaft 14 reduced to a point where it becomes idle and the maximum torque would then be transmitted through the oil to balance the backward movement of the internal gear against the back stop rollers 39 which action might be desirable in some cases.

In driving in congested traffic, it will not always be necessary to put the lever 54 in neutral position for a short traffic stop because a slight depression of the pedal 47 releases the back stop and if the treadle is pressed all the way down the nut 42 acts as a brake to hold the vehicle. In stopping on an upgrade the nut 42 may be removed sufficiently to merely release the back stop; that is, to allow the flange 41 to revolve, whereupon the engine may be accelerated through the operation of the throttle to provide sufficient engine torque to prevent the vehicle from rolling backwardly, without using the brakes. In going forwardly again, the pedal is released, the engine is accelerated through the throttle and the vehicle will start very smoothly. In low speed, when the internal gear has come to a stop in the device shown herein the gear ratio between the shaft 1 and the shaft 14 will be four to one. To secure efficient operation of the vehicle at low speed, a gear reduction will be selected which will be lower than the lowest speed at which the vehicle should be operated economically and the greatest efficiency will be at a point before the turbine wheels come to rest when the velocity of the oil carried by the fly wheel and the peripheral speed of the turbines reaches a ratio of two to one.

While the device is operating at some intermediate speed power is applied to the shaft 14 through three different instrumentalities; first, through the gear pressure tending to planetate the gears 26; second, the action of the oil carried by the fly wheel and impinging upon the blades of the turbines will counteract the planetary rotation of the gears 26 against a stationary member; and third, the direct impulsive action of the oil on the deflecting surfaces 66 of the weights. The first of these, or the gear reduction action reduces the speed of the shaft 14 and increases the torque. The second or turbine action tends to increase the speed and to reduce the torque.

When the internal gear 25 is stationary, the gear ratio will be at its maximum and the shaft 14 will run at a positive gear reduction ratio (four to one). The tendency to decrease the ratio is caused by the tendency of the turbine wheels to go forward under the impulse of the flow of oil.

The modified construction shown in Figures 12 to 15 inclusive is as follows: In the first described form of the invention the internal gear is moved forwardly for intermediate speeds and the oil carried by the fly wheel acts on the turbine wheels to rotate them and to take the internal gear along with them. In the form shown in Figures 12 to 15 the turbine wheels act on the oil and tend to give it a velocity which is greater than the velocity of the fly wheel and the resistance or back action on the turbine wheels, due to this accelerating of the oil creates a back pressure that causes the internal gear to be moved forward. In this construction the turbine wheels are shown attached by means of posts 71 to opposite points on the cover 4 which is a fixed part of the fly wheel, so that the turbines are carried around bodily, or planetate with the fly wheel.

The turbines move at a greater peripheral speed than the fly wheel and the oil propelled by the turbines reacts on the fly wheel to return to the latter energy from the turbines. Furthermore, any increase of the velocity of the oil caused by the turbines increases the impulsive action of the oil on the deflecting surfaces 66 of the weights. The first described of these two actions restores to the motor energy from the turbines by returning it through the oil to the fly wheel of the engine. The gears 72 fixed to the turbine wheels in this construction mesh with the external gear 73 which latter is movable with the internal gear 25 and the turbines are revolved on their own axes when the internal gear revolves slowly or comes to rest by reason of the resistance on the driven shaft, due to an increased load. As above pointed out, the rotation of the turbines on their own axes at the same time that they planetate with the fly wheel increases the velocity of the oil and the energy is absorbed in the fly wheel and the centrifugal weights 20. By this action the governor weights become driving members. These actions cause the internal gear to move forwardly and thereby change the speed ratio between the shafts as the torque on the driving shaft decreases, until a point is reached where the centrifugal weights 20 are moved by centrifugal action in opposition to the oil flow to bring the weights in direct clutching engagement with the fly wheel to establish a direct drive. In this construction I have shown only one back stop represented by the rollers 39 and the sleeve 9 but it is also possible to use this form of device without any back stop and to start the vehicle from zero speed.

The present mechanism will operate in either form with the turbine devices omitted. In that case the vehicle will be driven by direct speed ratio until the load reduces the motor speed. When the governor weights disengage from the fly wheel in such a case the low gears will drive the load, an acceleration of the motor speed will effect changes in intermediate speeds.

Having described my invention, what I claim is:

1. In a transmission device a driven shaft, a driving shaft for operating the same, transmission means interposed between said shafts, including means for coupling said shafts for operation by gear reduction ratio, including planetary gearing, fluid means for applying variable back stop pressure to said gearing to automatically modify said latter means to vary the gear ratio between said shafts from a fixed low speed to a high speed in accordance with the load on said driven shaft and a centrifugal clutch device for automatically coupling said shafts for direct drive when said driven shaft has reached a predetermined maximum speed by its operation through said planetary gearing.

2. In a transmission device a driven shaft, a driving shaft for operating the same, transmission means interposed between said shafts, including means for coupling said shafts for operation by gear reduction ratio, including planetary gearing, fluid means for applying variable back stop pressure to said gearing to automatically modify said latter means to vary the gear ratio between said shafts from a fixed low speed to a high speed in accordance with the load on said driven shaft and a centrifugal clutch device for automatically coupling said shafts for direct drive when said driven shaft has reached a predetermined maximum speed by its operation through said planetary gearing, said clutch device being adapted to automatically release said shafts from direct drive when the driven shaft operates below said predetermined maximum speed and restore said driven shaft to operation through said planetary gearing.

3. In a transmission device a driven shaft, a driving shaft, transmission means interposed between said shafts, for effecting variations in the gear ratio between said shafts, including planetary gears, fluid operated means for applying varying back stop pressure to said gearing to modify the gear ratio between said shafts from a higher to a lower ratio, means for automaticaly connecting said shafts for direct drive when said driven shaft reaches a predetermined maximum speed and adapted to automatically release said shafts from direct drive when the driven shaft operates below said maximum speed and restore said driven shaft to operation through said planetary gearing.

4. In a transmission device, a driven shaft, a driving shaft for operating the same, and transmission means interposed between said shafts, including means for automatically varying the gear ratio between said shafts in accordance with the variations in the relation of the load on the driven shaft to the torque on the driving shaft, means for connecting said shafts for direct drive, and centrifugal means for placing said latter means automatically into operation when said driven shaft has attained a predetermined speed, and fluid means for disengaging said direct driving means when the speed of the driven shaft falls below said predetermined speed.

5. In a transmission device, a driven shaft, a driving shaft for operating the same, and transmission means interposed between said shafts, including means for automatically varying the gear ratio between said shafts in accordance with the variations in the relation of the load on the driven shaft to the torque on the driving shaft, means for connecting said shafts for direct drive, centrifugal means for connecting said latter means automatically into operation when said driven shaft has attained a predetermined speed, and fluid means acting on said centrifugal means, for disengaging said direct driving means when the speed of the driven shaft falls below said predetermined speed.

6. In a transmission device a driven shaft, a driving shaft for operating the same, and transmission means interposed between said shafts, including means for automatically varying the gear ratio between said shafts in accordance with the variations in the relation of the load on the driven shaft to the torque on the driving shaft, a clutch for connecting said shafts for direct drive, and centrifugal means for operating said clutch, and fluid means operating on said centrifugal means for assisting the release of said clutch.

7. In a transmission device, a driven shaft, a driving shaft for operating the same, and transmission means interposed between said shafts, including means for automatically varying the gear ratio between said shafts in accordance with the variations in the relation of the load on the driven shaft to the torque on the driving shaft, a clutch for connecting said shafts for direct drive, and centrifugal means for operating said clutch and fluid means operating on said centrifugal means counter to its movement by centrifugal force for assisting the release of said clutch.

8. A transmission device including a driven shaft, a driving shaft for operating the same, means for connecting said shafts in direct operative relation and for disconnecting them at a certain speed, including centrifugal means for effecting the driving connection of said shafts, and fluid means operated from said driving shaft and impinging said centrifugal means for effecting the disconnection of the driving relation of said shafts.

9. A transmission device including a driven shaft, a driving shaft for operating the same, a clutch for connecting said shafts in direct driving relation, centrifugal means for operating said clutch at a predetermined speed, and liquid means operated from said driving shaft and impinging on said centrifugal means for releasing said clutch.

10. A transmission device including a driven shaft, a driving shaft for operating the same and having a fly wheel, a clutch for connecting said shafts in direct driving relation, centrifugal means for operating said clutch at a predetermined speed, and liquid means propelled by said fly wheel impinging on said centrifugal means and tending to release said clutch.

11. In a transmission device a driven shaft, a driving shaft for operating the same and having a fly wheel, a liquid propelled by said fly wheel, a clutch for connecting said shafts in driving relation, a centrifugal member for operating said clutch and having a deflecting surface acted upon by said liquid, whereby the force of the liquid will operate counter to centrifugal action on said centrifugal device to assist in the release of said clutch.

12. In a transmission device a driven shaft, a driving shaft therefor having a fly wheel, a liquid propelled by said fly wheel, a clutch for connecting said shafts in driving relation, a centrifugal member for operating said clutch and moving with the driven shaft, said centrifugal means being impelled by said liquid in opposition to centrifugal force to assist in the release of said clutch the impelling force of the liquid acting upon said centrifugal means as a partial driving force to said driven shaft.

13. A transmission device including a driven shaft, a driving shaft for operating the same, and transmission means interposed between said shafts, including a planetary gear, fluid means propelled from said driving shaft and revolvable means impinged by said fluid means and adapted to apply a resistible back stop pressure to said planetary gear to effect a change of gear ratio between said shafts, and means for forming a positive back stop for said planetary gear to prevent backward operation of said planetary gear.

14. In a transmission device a driven shaft, a driving shaft for operating the same and having a fly wheel, a centrifugal device operating with said driven shaft and adapted to effect a clutching action between said shafts to place them in direct drive, liquid means propelled by said fly wheel and acting on said centrifugal means in opposition to centrifugal force and tending to release said clutching engagement, a planetary gear device interposed between said shafts and means actuated by said liquid for modifying the action of said planetary gear device to vary the gear ratio between said shafts.

15. In a transmission device a driven shaft, a driving shaft, for operating the same, having a fly wheel, a planetary gear device interposed between said shafts including a pinion operating with the driving shaft, an internal gear, planetating gears interposed between gear, pinion and said internal gear and fixed to move in its planetary movements with said driven shaft, a liquid propelled by said fly wheel and means revolvably mounted on said internal gear and adapted to be impinged by said liquid for resisting the rotation of said internal gear to vary the gear ratio between said driving and driven shafts.

16. In a transmission device a driven shaft, a driving shaft for operating the same, having a fly wheel, a differential gear device interposed between said shafts, including a pinion operating with the driving shaft, an internal gear and a planet gear interposed between said pinion and said internal gear and mounted to move with the said driven shaft, a revolvable turbine wheel revolvably mounted on said internal gear to planetate with said internal gear and a liquid propelled by said fly wheel and acting on said turbine wheel to apply variable back stop pressure to said internal gear and thereby change the gear ratio between said driving and said driven shafts.

17. In a transmission device a driven shaft, a driving shaft for operating the same, a planetary gear device interposed between said shafts, fluid controlled means for modifying said planetary gear device to vary the gear ratio between said shafts automatically, and means for manually applying load to said driven shaft to effect a temporary backstop for said planetary gear device.

18. In a transmission device a driven shaft, a driving shaft for operating the same, a planetary gear device interposed between said shafts, fluid means adapted to apply a variable back stop pressure to modify the gear ratio between said shafts, means for applying a positive back stop to said planetary gear device, means for applying load to said driven shaft and manually operating means for releasing said positive back stop and for applying load to said driven shaft.

19. In a transmission device a driven shaft, a driving shaft for operating the same, and transmission means between said shafts, including planetary gearing which includes an annular gear, fluid means operated from said driving shaft, a turbine wheel revolvably mounted upon the annular gear of said planetary gearing to revolve in relation thereto and acted upon by said fluid means to apply variable back stop pressure to said gearing, and an automatically operating positive back stop for said gearing serving as a fulcrum for said fluid means.

20. In a transmission device a driven shaft, a driving shaft for operating the same, and transmission means between said shafts, including planetary gearing, fluid means operated from said driving shaft, a turbine wheel impelled by said fluid means to apply variable back stop pressure to said gearing, said fluid means so acting on said turbine that the impelling force will be applied as a driving force to said driven shaft, and means acting as a positive back stop for said gearing to form a fulcrum for said variable means.

21. In a transmission device a driven shaft, a driving shaft for operating the same, transmission means between said shafts, including planetary gearing, including an annular gear, a sun gear and planet gears between the annular and sun gears, a turbine wheel revolvably mounted on said annular gear to revolve in relation thereto and arranged to apply resistable back stop pressure to said annular gear, and liquid means operated from said driving shaft and impinging on said turbine wheel to apply said back stop pressure.

22. In a transmission device a driven shaft, a driving shaft for operating the same, transmission means between said shafts, including planetary gearing, including an annular gear, a sun gear and planet gears between the annular and sun gears, a turbine wheel revolvably mounted on said annular gear to revolve in relation thereto and arranged to apply resistable back stop pressure to said annular gear, and liquid means operated from said driving shaft and impinging on said turbine wheel to apply said back stop pressure, said liquid means so acting on said turbine wheel that the impelling force thereof is applied also as a driving force to said driven shaft.

23. In a transmission device a driven shaft, a driving shaft for operating the same, transmission means between said shafts, including planetary gearing, including an annular gear, a sun gear and planet gears between the annular and sun gears, a turbine wheel revolvably mounted on said annular gear to revolve in relation thereto and arranged to apply resistable back pressure to said annular gear, and liquid means operated from said driving shaft and impinging on said turbine wheel to apply said back stop pressure, and means for applying a positive back stop pressure to said turbine wheel in one direction.

Signed at the city, county and State of New York, this 24th day of August, 1928.

EMIL ANDERSON.